United States Patent
Fechner et al.

(10) Patent No.: US 7,498,731 B2
(45) Date of Patent: Mar. 3, 2009

(54) GLASS FOR AN EEFL FLUORESCENT LAMP, PROCESS FOR MAKING THE GLASS AND DEVICES INCLUDING ARTICLES MADE WITH THE GLASS

(75) Inventors: Joerg Fechner, Mainz (DE); Franz Ott, Mitterteich (DE); Brigitte Hueber, Schwandorf (DE)

(73) Assignee: Schott AG, Mainz (DE)

( * ) Notice: Subject to any disclaimer, the term of this patent is extended or adjusted under 35 U.S.C. 154(b) by 619 days.

(21) Appl. No.: 11/178,760

(22) Filed: Jul. 11, 2005

(65) Prior Publication Data

US 2006/0006786 A1    Jan. 12, 2006

(30) Foreign Application Priority Data

Jul. 12, 2004    (DE) .................. 10 2004 033 653

(51) Int. Cl.
*C03C 3/091*    (2006.01)
*C03C 3/093*    (2006.01)
*H01J 5/00*    (2006.01)

(52) U.S. Cl. .................. 313/493; 501/65; 501/66; 65/134.4

(58) Field of Classification Search .................. 501/66, 501/65; 313/493; 65/134.4
See application file for complete search history.

(56) References Cited

U.S. PATENT DOCUMENTS

| 4,565,791 | A | 1/1986 | Boudot et al. |
| 5,747,399 | A | 5/1998 | Kosokabe et al. |
| 6,204,212 | B1 | 3/2001 | Kunert et al. |
| 6,769,272 | B2 | 8/2004 | Roeth et al. |
| 2002/0074930 | A1 | 6/2002 | Futagami et al. |
| 2004/0266603 | A1* | 12/2004 | Fechner et al. ................. 501/66 |
| 2005/0037911 | A1* | 2/2005 | Fechner et al. ................. 501/66 |
| 2006/0006786 | A1* | 1/2006 | Fechner et al. ............... 313/493 |
| 2006/0009343 | A1* | 1/2006 | Fechner et al. ................. 501/65 |

FOREIGN PATENT DOCUMENTS

| DE | 198 42 942 A1 | 4/2000 |
| DE | 102004027119 A1 | 12/2004 |
| EP | 1 127 851 A2 | 8/2001 |
| EP | 0 936 195 B1 | 6/2002 |

* cited by examiner

*Primary Examiner*—Karabi Guharay
(74) *Attorney, Agent, or Firm*—Michael J. Striker

(57) ABSTRACT

Glass for gas discharge tubes, which are used in fluorescent lamps, especially EEFL and miniaturized lamps, LCD displays, computer monitors, telephone displays and TFT displays, and a process for making it are described. The glass contains, in % by weight based on oxide content: $SiO_2$, 60-85; $B_2O_3$, 0-10; $Al_2O_3$, 0-10; $Li_2O$, 0-10; $Na_2O$, 0-20; $K_2O$, 0-20; $MgO$, 0-8; $CaO$, 0-20; $SrO$, 0-5; $BaO$, 0-5; $ZnO$, 0-8; $ZrO_2$, 0-5; $TiO_2$, 0-10; $Fe_2O_3$, 0-5; $CeO_2$ 0-5; $MnO_2$, 0-5; $Nd_2O_3$, 0-1.0; $WO_3$, 0-2; $Bi_2O_3$, 0-5; $MoO_3$, 0-5; $PbO$, 0-5; $As_2O_3$, 0-1; $Sb_2O_3$, 0-1; $SO_4^{2-}$, 0-2; $Cl^-$, 0-2 and $F^-$, 0-2, wherein $\Sigma$ $Li_2O+Na_2O+K_2O$=5-25% by weight; $\Sigma$ $MgO+CaO+SrO+BaO$=3-20; $\Sigma$ $Fe_2O_3+CeO_2+TiO_2+PbO+As_2O_3+Sb_2O_3$ is at least 0-10; and $\Sigma$ $PdO+PtO_3+PtO_2+PtO+RhO_2+Rh_2O_3+IrO_2+Ir_2O_3$ is 0.1.

21 Claims, 2 Drawing Sheets

GLASS FOR AN EEFL FLUORESCENT LAMP, PROCESS FOR MAKING THE GLASS AND DEVICES INCLUDING ARTICLES MADE WITH THE GLASS

BACKGROUND OF THE INVENTION

1. Field of the Invention

The present invention relates to the use of soda lime glass for making fluorescent lamps. It also relates to a glass with strong UV-absorbing properties, which at the same time has reduced absorption in the visible range and to a process for making it.

2. Related Art

Known glasses with UV-absorbing properties are usually used for making liquid crystal displays (LCD), monitors and/or display screens, as well as for making gas discharge tubes, and especially fluorescent lights. This sort of glass is used for light sources, among other things, in rear illuminated display screens (so-called backlight displays). For this sort of application the fluorescent lights must have only very small dimensions and correspondingly the lamp glass has only an extremely small thickness.

The gas acting as a light source contained in this sort of lamp is ignited by applying a voltage by means of electrodes, i.e. to the light source. Usually the electrodes are arranged within the lamp, i.e. the electrically conducting metal wires pass through the lamp glass and are sealed in the lamp glass in a gas-tight manner. However it is also possible to ignite the gaseous light source and/or the plasma inside the lamp by an externally generated electric field, i.e. by electrodes that are outside of the lamp, which do not pass through the lamp glass. This sort of lamp is generally known as an EEFL lamp (external electrode fluorescent lamp). In this sort of lamp it is important that the radiated high frequency energy is not absorbed or only absorbed to a small extent by the lamp glass, in order to ignite the gas acting as the light source in the fluorescent lamp. This assumes that the glass has an extremely small dielectric constant and an extremely low dielectric loss factor, tan δ. The dielectric loss factor acts as a measure for the energy absorbed in the excited dielectric alternating field and converted into dissipated heat.

Furthermore the permeability or transmission of visible light should be kept relatively constant in glasses used for this sort of application up to the wavelength range below 400 nm, especially below 380 nm.

In contrast to the high light transmission in the visible range the transmission in the UV range should be as small as possible or the glass should be as impermeable as possible for light in the UV range.

Gas discharge tubes, especially fluorescent lamps, emit a large fraction of their radiation in the UV range, which has a damaging effect for the surrounding components, such as polymer and other plastic, so that they become yellowish and/or brittle, which can make the entire product unusable. Also turbidity, a so-called haze, can be produced in optical components exposed to intense UV radiation. The mercury line at 313 nm is an especially damaging emission line. Thus one goal is to make glass of this type, which absorbs this emission line as completely as possible. Thus it is desirable to change the high transmission in the visible range to a more or less complete absorption within a few nanometers at the transition to the UV range, which is also called a sharp UV cutoff. The less the spacing between maximum transmission and maximum absorption, the steeper is the UV cutoff.

Fluorescent lamp glasses for the above-described application, which absorb UV radiation to the desired extent, are known from U.S. Pat. No. 5,747,399. However it has been shown that this sort of glass is characterized by a strong discoloration in the visible range and strong solarization. Frequently a yellow brown discoloration is produced already during melting of the raw materials.

Strongly UV-absorbing glass, which is suitable as a lamp glass for fluorescent lights, especially those used for light sources for liquid crystal displays (LCD) in rear-illuminated displays, is known from 10 2004 027 119.4. This glass has good transmission in the visible range from 400 to 800 nm besides outstanding absorption behavior for UV light up to 335 nm and is fused or bonded with metals, especially electrode metals guided through it, such as Fe, Co and Ni alloys (e.g. KOVAR® alloys) and with tungsten and/or molybdenum metals.

A zirconium oxide-containing and lithium oxide-containing borosilicate glass of high resistance is known from DE-A 198 42 942, which is especially suitable for use as solder or fusing glass with Fe—Co—Ni alloys. One such glass can also contain color-imparting ingredients, such as $Fe_2O_3$, $Cr_2O_3$, CoO and $TiO_2$.

U.S. Pat. No. 4,565,791 describes a glass for ophthalmologic applications, which has special refractive indices and Abbé numbers and densities suitable for that purpose. A glass of this sort has a UV-absorption limit between 310 and 335 nm and contains $TiO_2$ as UV absorber. It is explicitly stated that refining with chloride is necessary in many cases in order to make this glass, since $As_2O_3$ and $Sb_2O_3$ refining is insufficient. Finally the reference likewise states that although the glass of this type is extremely thin a combination of $Fe_2O_3$ and $TiO_2$ leads to discoloration of the glass, which is the reason that quartz material with an iron content of less than 100 ppm should be exclusively used.

SUMMARY OF THE INVENTION

It is an object of the present invention to provide a glass, which is suitable for displays and/or signaling devices, especially for rear illuminated displays, and for liquid crystal displays and fluorescent lights.

It is another object of the present invention to provide a glass for a glass discharge tube for a fluorescent light, which can be ignited from outside by induction and requires no metal wires or electrodes through the glass tube.

Furthermore the glass should likewise have great UV blocking properties, so that the liquid crystals of the displays, which are frequently based on organic materials, the polymeric components surrounding the lamp and the so-called diffuser (light scattering unit) and other parts are not attacked by the UV radiation, in order to guarantee a long service life for the display or image-displaying screen. Since, on the other hand, the visible light should pass unhindered through the glass, the transition from high transmission in the visible range (transmission>80% or 90%, absorption<20% or <10%) to high absorption in the UV range (absorption>95% or 99%, preferably 99.9%) should be comparatively sharp, i.e. within a wavelength range of only a few nanometers, and of course especially for thin glass, i.e. for glass with a small thickness of d=0.2 mm. The glass should thus have as sharp as possible a UV cutoff, i.e. the transmission should rapidly drop to zero within a few nanometers at a selected or desired wavelength. The smaller the spacing between the wavelength, at which transmission is a maximum, and the wavelength, at which absorption is maximum, the steeper or sharper is the absorption cutoff.

The glass according to the invention, which is defined in the appended claims, attains the above-described objects and purposes of the invention.

According to one aspect of the present invention the UV-absorbing glass is made by a process, which comprises preparing a glass melt with a composition, in % by weight on an oxide basis of:

| | |
|---|---|
| $SiO_2$ | 60-85 |
| $B_2O_3$ | 0-10 |
| $Al_2O_3$ | 0-10 |
| $Li_2O$ | 0-10 |
| $Na_2O$ | 0-20 |
| $K_2O$ | 0-20 |
| MgO | 0-8 |
| CaO | 0-20 |
| SrO | 0-5 |
| BaO | 0-5 |
| ZnO | 0-8 |
| $ZrO_2$ | 0-5 |
| $TiO_2$ | 0-10 |
| $Fe_2O_3$ | 0-5 |
| $CeO_2$ | 0-5 |
| $MnO_2$ | 0-5 |
| $Nd_2O_3$ | 0-1.0 |
| $WO_3$ | 0-2 |
| $Bi_2O_3$ | 0-5 |
| PbO | 0-5 |
| $MoO_3$ | 0-5 |
| $As_2O_3$ | 0-1 |
| $Sb_2O_3$ | 0-1 |
| $SO_4^{2-}$ | 0-2 |
| $Cl^-$ | 0-2 |
| $F^-$ | 0-2; | wherein a sum total amount of $Li_2O+Na_2O+K_2O$ is 5 to 25% by weight; a sum total amount of $MgO+CaO+SrO+BaO$ is 3 to 20% by weight; a sum total amount of $Fe_2O_3+CeO_2+TiO_2+PbO+As_2O_3+Sb_2O_3$ is at least 0.1 to 10% by weight; and a sum total amount of $PdO+PtO_3+PtO_2+PtO+RhO_2+Rh_2O_3+IrO_2+Ir_2O_3$ is from 0.00001-0.1% by weight.

In preferred embodiments of the invention the glass melt contains from 0.1-10% by weight of $TiO_2$; from 0.005-0.5% by weight of $Fe_2O_3$ and/or from 0-0.5% by weight of $CeO_2$, preferably less than 300 ppm of $CeO_2$. It is particularly preferred when the process includes refining and/or melting a glass batch from which the glass melt is formed under oxidizing conditions and when the oxidizing conditions are provided by of alkali nitrates and/or alkaline earth nitrates to the glass batch.

It was surprisingly found according to the invention that the above-described goals or objects could be attained in an economical manner with soda lime glass. This is all the more surprising since it is known that soda lime glass of this type converts electrical energy into heat under an applied alternative voltage because of high dielectric constants and high dielectric loss angles. Thus high energy losses and extremely high heating of the glass would be expected for applications of this sort of glass, especially fluorescent and/or gas discharge tubes, which should lead to rapid corrosion of the glass material. However it has been shown surprisingly that this is not the case and that this sort of glass is indeed very suitable for these applications. The invention thus includes lamp systems of the foregoing type, i.e. fluorescent lights and backlighting arrangements for displays, which include the UV-absorbing glass according to the invention, which is made by the process according to the invention. According to the invention it was found that the above-described problems may be solved with a silicate glass, which has a minimum content of $SiO_2$ of at least 60% by weight, preferably at least 62% by weight, wherein a minimum amount of 64% by weight is especially preferred. The maximum content of $SiO_2$ according to the invention amounts to at most 85% by weight, especially at most 79% by weight, but a content of at most 75% by weight is particularly preferred. The most preferred highest content of $SiO_2$ is 72% by weight.

The $B_2O_3$ content amounts to at most 10% by weight, especially at most 5% by weight, wherein a content of 4% by weight at the highest is particularly preferred. Especially a maximum amount of $B_2O_3$ of 3% by weight at the highest is especially preferred, wherein a content of 2% by weight at the highest is particularly preferred. In individual cases the glass according to the invention can be free of $B_2O_3$. However it contains at least 0.1% by weight in a preferred embodiment, wherein 0.5% by weight is a particularly preferred minimum amount. A minimum amount of 0.75% by weight is a more preferred minimum amount, but 0.9% by weight is most preferred.

Although the glass according to the invention can be free of $Al_2O_3$ in individual cases, usually it contains a minimum amount of 0.1, especially 0.2, % by weight. However minimum amounts of 0.3, of 0.7 and especially at least 1.0, % by weight are preferred. The highest amount of $Al_2O_3$ in the glass according to the invention is typically 10% by weight, but a maximum amount of 8% by weight is preferred. In many cases a highest amount of $Al_2O_3$ of 5% by weight, especially 4% by weight, has proven to be sufficient.

The glass according to the invention contains alkali and alkaline earth oxides. The total amount of alkali oxides present amounts to at least 5% by weight, especially at least 6% by weight, preferably however at least 8% by weight, wherein at minimum total amount of alkali oxides of at least 10% by weight is especially preferred. The maximum content of all alkali oxides amounts to 25% by weight at the highest, but a maximum content of all alkali oxides of 22% by weight and especially of 20% by weight is preferred. In many cases at least amount of 18% by weight has proven to be sufficient. The content of $Li_2O$ according to the invention is from 0 to at most 10% by weight, wherein a highest amount of 8% by weight and especially 6% by weight at maximum is preferred. $K_2O$ is contained in an amount of at least 0 to at the highest 20% by weight, but $K_2O$ has a minimum content of 0.01% by weight, preferably from 0.05% by weight. In individual cases a minimum amount of 1.0% by weight has proven to be suitable. The highest content of $K_2O$ in a preferred embodiment is 18% by weight, wherein a maximum of 15% by weight and especially a maximum of 10% by weight are preferred. In many cases a maximum content of 5% by weight has proven to be completely satisfactory.

The content of $Na_2O$ in individual cases amounts to from 0% by weight to at most 20% by weight. Preferably the content of $Na_2O$ however amounts to at least 3% by weight, especially at least 5% by weight, wherein a content of at least 8% by weight, especially at least 10% by weight is preferred. In special embodiments sodium according to the invention is contained in an amount of at least 12% by weight. A preferred maximum amount of $Na_2O$ amounts to 18% by weight and/or 16% by weight, however an upper limit of 15% by weight is particularly preferred.

The alkaline earth oxide CaO is contained in the glass of the invention in an amount of 20% by weight at maximum, but in the case of individual embodiments a maximum amount of 18, especially 15, % by weight is sufficient. Although the glass according to the invention can be free of calcium ingredients, the glass according to the invention may contain at least 1, and especially at least 2, and particularly at least 3, % by weight of CaO. In practice however a minimum amount of CaO of 4% by weight has proven to be suitable. The lower limit for MgO content amounts to 0% by weight in individual cases. However at least 1, preferably at least 2, % by weight of MgO is preferred. The highest content of MgO in the glass according to the invention amounts to 8% by weight, but a maximum of 7, especially 6, % by weight is preferred. SrO and/or BaO can be completely omitted from the glass according to the invention. Preferably one or both of SrO and BaO are present in an amount of at least 1, preferably at least 2, % by weight. The sum total amount of all alkaline earth oxides contained in the glass amounts to at least 3% by weight and at most 20% by weight. However minimum amounts of 4, especially 5, % by weight of all alkaline earth oxides are preferred. In many cases a minimum amount of alkaline earth oxides of 6 or 7% by weight has proven suitable. A preferred highest amount of alkaline earth oxides amounts to 18% by weight, but a maximum amount of 15% by weight is particularly preferred. In quite a few cases a maximum amount of 12% by weight of the sum total of all alkaline earth oxides has proven to be sufficient. Preferably the glass according to the invention is a soda lime glass.

The glass according to the invention can be free of ZnO, however it can be contained in the glass preferably in a minimum amount of 0.1% by weight and a maximum amount of at most 8, preferably at most 5, % by weight. However a maximum content of at most 3, or even 2, % by weight has proven to be suitable. $ZrO_2$ is present in the glass in an amount of 0-5% by weight, especially 0-4% by weight, but a maximum amount of 3% by weight has proven to be sufficient in many cases.

The glass according to the invention is characterized in preferred embodiments by a sum total content of $TiO_2$, PbO, $As_2O_3$ and/or $Sb_2O_3$ in an amount of at least 0.1% by weight and at most 2% by weight, especially at most <1% by weight. The preferred minimum content of $As_2O_3$ and $Sb_2O_3$ is at least 0.01% by weight, preferably at last 0.05% by weight and especially at least 0.1% by weight. The usual maximum amount is 2, especially 1.5, % by weight, but a maximum of 1, especially 0.8, % by weight is particularly preferred. Of the above-mentioned ingredients $TiO_2$ is especially preferred in the glass according to the invention, although the glass can be free of $TiO_2$, in so far as the content of the other ingredients mentioned above is correspondingly increased. The maximum amount of $TiO_2$ is preferably to 8% by weight, wherein a maximum amount of $TiO_2$ of 5% is preferred. A preferred minimum amount of $TiO_2$ is 0.5, especially 1, % by weight. The glass contains 0-5% by weight of PbO, but a maximum amount of 2% by weight, especially 1% by weight, is preferred. Preferably the glass according to the invention is lead-free. The ingredients $Fe_2O_3$ and/or $CeO_2$ are each present in an amount of 0 to 5% by weight, but from 0 to 1, especially from 0-0.5, % by weight is the preferred concentration range. The content of $MnO_2$ and/or $Nd_2O_3$ amounts to from 0-5% by weight, but a concentration range of 0-2, especially 0-1, % by weight is particularly preferred. $Bi_2O_3$ and/or $MoO_3$ are each present in an amount of 0-5, preferably 0-4, % by weight and $As_2O_3$ and/or $Sb_2O_3$ are each present in the glass according to the invention in an amount of 0-1% by weight, wherein the lower limit of the minimum content is preferably 0.1, especially 0.2, % by weight. The glass according to the invention contains small amounts of $SO_4^-$ of 0 to 2% by weight, and $Cl^-$ and/or $F^-$ are similarly each contained in an amount of 0-2% by weight. The sum total amount of $Fe_2O_3$, $CeO_2$, $TiO_2$, PbO, $As_2O_3$ and $Sb_2O_3$ is thus 0.1 to 10% by weight, preferably 0.3 or 0.5-8% by weight.

According to the invention it was found that the UV transmission cutoff can be adjusted by means of $Fe_2O_3$ in a synergistic way. Although it is known that $Fe_2O_3$ leads to a discoloration of the base glass in the visible range and thus to undesired absorption at visible wavelengths, it was found that the glass according to the invention was not discolored in the visible range or at most in a manner that does not interfere, when, as described above, the glass is refined under oxidative conditions. In this way it is now possible according to the invention to limit the content of $TiO_2$ in the glass. It has been shown that especially the $TiO_2$ dissolved in the base matrix separates into two phases, especially with higher $TiO_2$ amounts, with slow cooling and/or with re-heating, e.g. during further processing, which leads to a Tyndall effect, which scatters transmitted light. This can be avoided now according to the invention by addition of $Fe_2O_3$ to the base glass under oxidative conditions and the inherent reduction of $TiO_2$ because of that. The amount of $Fe_2O_3$ used preferably amounts to at least 50 ppm, especially at least 100 ppm, but amounts of 120 and/or 140 ppm are preferred. Customary minimum amounts of 150 ppm and especially 200 ppm are preferred. The upper limit of $Fe_2O_3$ content is determined by desired adjustment of the UV transmission cutoff and thus the UV absorption behavior. However an upper limit of at most 1500 ppm and especially of 1200 ppm has proven to be suitable, but an upper limit of 1000 ppm is especially suitable. Upper limits of 800 ppm and especially 500 ppm have proven to be especially suitable. In many cases a maximum content of 400 ppm is sufficient. According to the invention it has been shown that the UV cutoff is shifted about 1 to 1.5 nm to higher wavelengths by addition of about 100 ppm of $Fe_2O_3$.

In the case, in which $Fe_2O_3$ is present, it has been shown that a minimum amount of $TiO_2$ of 0.5% by weight and especially of 0.7% by weight and/or 0.8% by weight are sufficient for the UV absorption behavior. The upper limit for the amount of $Fe_2O_3$ present is 4.5% by weight, especially 4% by weight, but an upper limit of 3.5% is especially preferred. However in many cases an upper limit of 3% by weight, especially 2.8% by weight and even 2.5% by weight, has proven to be completely sufficient.

It has been shown that, although the glass according to the invention is very stable against solarization by UV radiation, its solarization stability can be further increased by including PdO, $PtO_3$, PtO, $RhO_2$, $Rh_2O_3$, $IrO_2$ and/or $Ir_2O_3$ in a small total amount of from 0.00001-0.1% by weight. The usual maximum amount of these substances amounts to at most 0.1% by weight, preferably a maximum of 0.01% by weight and especially a maximum of 0.001% by weight. The minimum amount of these ingredients for this purpose is typically 0.01 ppm, but at least 0.05 ppm and especially at least 0.1 ppm is preferred. A content of 1 ppm has proven to be especially preferred.

The glass according to the invention is characterized by outstanding UV blocking up to at least 260 or 270 nm, preferably up to at least 300 nm and especially up to 313 nm. In many cases the glass according to the invention has a UV blocking up to 320 nm, especially even up to 335 nm. The transmission in these UV blocking wavelength ranges amounts to less than 0.1% with a thickness of 0.2 mm. Even values of transmission less than 0.05% are achieved at the especially critical wavelength of 313 nm for Hg. At wavelengths that are greater than those of UV light, especially in the visible range of 400 to 800 nm, the glass according to the invention is characterized by an outstanding transmission of at least 80%, preferably 90%, with a layer thickness d=0.2 mm.

Furthermore the glass has only a small dielectric constant DZ of at most 12, preferably at most 10 and especially preferably at most 9. In a preferred embodiment the glass according to the invention has a dielectric lost factor tan δ [$10^{-4}$] of at most 120, preferably <100, but <80 is particularly preferred (measured at 1 MHz and 25° C.).

The glass according to the invention may be made by means of the conventional melt process known to those skilled in the glass arts. Preferably however the manufacture takes place under oxidizing conditions. The preferred refining agents are $As_2O_3$ and/or $Sb_2O_3$. The minimum amount that in many cases is suitable is 0.1% by weight, but 0.2% by weight is preferred. However other oxidative refining methods, for example refining with oxygen, can be used in the process of the invention. Oxygen, if necessary, can be generated electrochemically in situ. A process of this type is described, e.g. in EP-A 1 127 851. In an especially preferred embodiment the oxidizing state of the melt is produced by adding nitrates. Preferred nitrate additives are alkali metal and alkaline earth nitrates, especially $LiNO_3$, $NaNO_3$ $KNO_3$, $Mg(NO_3)$, $Ca(NO_3)_2$, $Sr(NO_3)_2$, $Ba(NO_3)_2$ and/or $ZnNO_3$. These additives are already included in the starting batch for making the melt by replacement of suitable carbonates. Also the melt has a maximum of 10% by weight, preferably at most 6, especially 5, % by weight of alkali and/or alkaline earth nitrates and/or $ZnNO_3$. It was found that not only a high UV blocking can be attained by the oxidative refining, but also the glass according to the invention has only the most minimal discoloration, if any, in the visible wavelength range.

According to the invention these above-described disadvantages may be further avoided when refining is performed with $As_2O_3$ and of course under oxidizing conditions and when $TiO_2$ is added for adjusting the UV cutoff. According to the invention it has been shown that the above-described disadvantages may be avoided when at least 80%, generally at least 90%, preferably at least 95% and especially 99% of the $TiO_2$ is present as $Ti+^4$. In many cases 99.9 and 99.99% of the titanium is present as $Ti+^4$. In individual cases a titanium content of 99.999% $Ti+^4$ has proven to be significant. Under oxidizing conditions it is to be understood that $Ti+^4$ is present in the above-stated amounts or is oxidized to this oxidation state. These oxidative conditions may be easily attained in the melt according to the invention, for example, by addition of nitrates, such as alkali nitrates and/or alkaline earth nitrates and zinc nitrate, as needed. An oxidizing melt can also be produced by blowing oxygen and/or dry air through it. Furthermore it is possible to produce an oxidative melt in the method according to the invention by means of an oxidizing burner adjustment, for example during melting of crude ware or blanks.

The procedure according to the invention has proven suitable for avoiding color-forming faults and defects in the glass matrix, some of which are formed by solarization, which are at least greatly reduced.

The process according to the invention and/or the glass is made by preparing a melt from conventional starting materials, in which alkali oxides, such as Na, K and Li oxides, are added as the suitable carbonates and preferably as nitrates. The use of halides and sulfates is preferably avoided in the process according to the invention. During oxidative refining by means of $As_2O_3$ however minimal traces of sulfate in the melt or in the raw material for it can be present as long as they do not exceed 0.2 Mol % and especially 0.1 Mol %. The glass is refined from crude products that are melted in a known way and preferably by using $As_2O_3$. The process according to the invention is preferably performed without $Sb_2O_3$ as refining agent and is preferably free of it. The content of alkali and/or alkaline earth oxides added as nitrates amounts to at most 8% by weight, preferably 6% by weight and especially at most 2% by weight. However the minimum amount usually amounts to at least 0.1% by weight, although 0.5% by weight is especially preferable. The nitrates themselves are preferably used in the process according to the invention in amounts of at least 0.3 Mol %, preferably 1 Mol %, wherein a customary maximum amount is 6 Mol % and especially a maximum amount of 5 Mol %.

The refining agent $As_2O_3$ is used in a process according to the invention in an amount of at least 0.01% by weight, preferably at least 0.05% by weight and especially at least 0.1% by weight. The customary maximum amount is 2% by weight, especially 1.5% by weight, wherein a maximum amount of 1% by weight, especially of 0.8% by weight, is preferred.

The $TiO_2$ content, by which the size and/or sharpness and position of the UV-absorption cutoff is adjustable, preferably amounts to at least 0.05% by weight, typically at least 0.01% by weight, wherein at least 0.5% by weight is especially preferred. In most cases a minimum amount of 1% by weight and/or 2% by weight has proven suitable for UV blocking up to at least 260 nm (layer thickness 0.2 mm). Amounts of at least 4% by weight, preferably at least 4.5% by weight, have proven to be sufficient to obtain blocking up to 310 nm (layer thickness of 0.2 mm). The customary highest amount for this wavelength range amounts to 6% by weight, preferably 5.5% by weight $TiO_2$. The maximum amount of $TiO_2$ according to the invention amounts to a 12% by weight, customarily 10% by weight and most preferably 8% by weight.

According to the invention it was found that the UV transmission cutoff can be adjusted by means of $Fe_2O_3$ in a synergistic way. Although it is known that $Fe_2O_3$ leads to a discoloration of the base glass in the visible range and thus to undesired absorption at visible wavelengths, it was found that the glass according to the invention was not discolored in the visible range or at most in a manner that does not interfere, when, as described above, the glass is refined under oxidative conditions. Iron present in the glass is converted into its +3 oxidation state or a reduction from this state is prevented because of the oxidative conditions during the melting and/or refining. In this way it is now possible according to the invention to limit the content of $TiO_2$ in the glass. It has been shown that especially the $TiO_2$ dissolved in the base matrix separates into two phases, especially with higher $TiO_2$ amounts, with slow cooling and/or with re-heating, e.g. during further processing, which leads to a Tyndall effect, which scatters transmitted light. This can be avoided now according to the invention by addition of $Fe_2O_3$ to the base glass under oxidative conditions and the inherent reduction of $TiO_2$ because of that. The amount of $Fe_2O_3$ used preferably amounts to at least 50 ppm, especially at least 100 ppm, but amounts of 120 and/or 140 ppm are preferred. Customary minimum amounts of 150 ppm and especially 200 ppm are preferred. The upper limit of $Fe_2O_3$ content is determined by desired adjustment of the UV transmission cutoff and thus the UV absorption behavior. However an upper limit of at most 1500 ppm and especially of 1200 ppm has proven to be suitable, but an upper limit of 1000 ppm is especially suitable. Upper limits of 800 ppm and especially 500 ppm have proven to be especially suitable. In many cases a maximum content of 400 ppm is sufficient. According to the invention it has been shown that the UV cutoff is shifted about 1 to 1.5 nm to higher wavelengths by addition of about 100 ppm of $Fe_2O_3$.

In the case, in which $Fe_2O_3$ is present, it has been shown that a minimum amount of $TiO_2$ of 0.5% by weight and especially of 0.7% by weight and/or 0./8% by weight are sufficient for the UV absorption behavior. The upper limit amounts to 4.5% by weight, especially 4% by weight, in the presence of $Fe_2O_3$, but an upper limit of 3.5% is especially preferred. However in many cases an upper limit of 3% by weight, especially 2.8% by weight and even 2.5% by weight has proven to be completely sufficient.

The invention also concerns a process for making a UV absorbing glass with reduced absorption in the visible range. A melt is made from raw materials and/or waste glass, which have the composition defined in the claims. The process according to the invention is characterized by the fact that no high purity starting materials are required, especially no high purity $SiO_2$ starting material. Instead the $SiO_2$ starting material can have a content of $Fe_2O_3$ of >100 ppm and/or >500 ppm, especially 600 ppm. Mostly the starting material has a content of >120 ppm and/or >130 ppm, however a content of >150 ppm or even 200 ppm can be used in the process according to the invention. In many cases an $SiO_2$ starting material with an iron content of >800 ppm, especially of >1000 ppm up to >12000 ppm, has proven to be suitable. Since iron-free base material leads to increased costs in glass manufacture, thus the procedure according to the invention not only has surprisingly technical benefits, but facilitates a substantially more economical manufacture.

It has been shown that an especially sharp UV cutoff can be adjusted by means of the process according to the invention and in the glass according to the invention, so that UV blocking up to 260 nm, especially up to 270 nm and particularly up to 300 nm, can be attained without difficulties. In an especially preferred embodiment the glass according to the invention blocks UV radiation up to 320 nm and especially up to 335 nm. It is possible to provide a UV cutoff without or with minimal impairment of the visible wavelength range by addition of $TiO_2$ by means of the refining with $As_2O_3$ and $TiO_2$.

The glass composition according to the invention is especially suitable for flat glass, especially made by the float process, but the use of the glass composition for glass tubing is especially preferred. The glass compositions according to the invention are especially suitable for making tubing with a diameter of at least 0.5 mm, especially at least 1 mm, and with an upper limit of at most 2 cm, especially at most 1 cm. Tubing diameters between 2 mm and 5 mm are especially preferred. It has proven suitable when the tubing has a wall thickness of at least 0.05 mm, especially at least 0.1 mm, but at least 0.2 mm is especially preferred. Maximum wall thicknesses amount to at most 1 mm, but wall thicknesses of at most <0.8 mm and/or <0.7 mm are preferred.

The glass according to the invention is especially suitable for use in glass discharge tubes, such as fluorescent lights, especially miniaturized fluorescent lights and is especially suitable for lighting, especially for background lighting of electronic display devices, such as displays and LCD screens, for example in mobile telephones and computer monitors. Preferred displays and imaging devices are so-called flat screen displays, especially surface backlighting devices. Halogen-free lighting devices, for example those based on gas discharges including xenon atoms (Xenon lamps), are especially preferred. These apparatuses have proven to be especially environmentally friendly.

The glass according to the invention is especially useful for fluorescent lamps with external electrodes and for fluorescent lamps, in which the electrodes are fused with the lamp glass and pass through it, for example KOVAR® alloys, etc. The external electrodes can be formed for example by an electrically conducting paste.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1A:
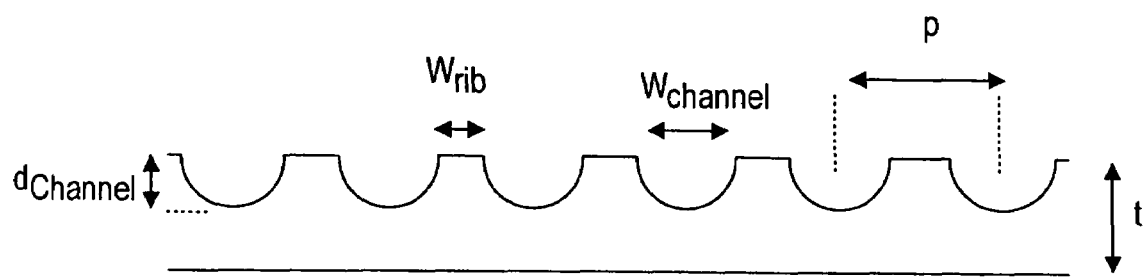
FIG. 1a is diagrammatic cross-sectional view of a reflecting base and/or support and substrate plate for a miniaturized backlight arrangement, which is shown in FIG. 1b.
Figure 1B:
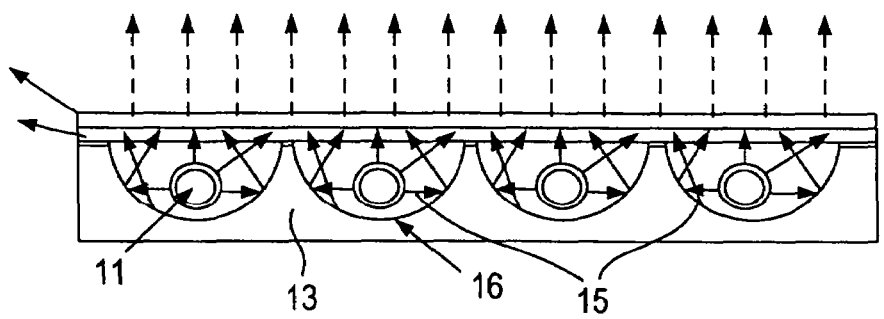
FIG. 1b is a schematic cross-sectional view through a miniaturized backlight arrangement.

In a special arrangement according to FIGS. 1a and 1b the glass is used to make low pressure discharge lamps, especially for a backlight arrangement. A special use is for those applications, in which individual miniaturized lighting tubes 11 are arranged parallel to each other and in a plate 13 provided with depressions or troughs 15, which reflect the issuing light on the display. A reflecting layer 16 is applied on the reflecting plate 13, which uniformly scatters the light and thus provides for a uniform illumination of the display. This arrangement is preferred for larger displays used, e.g. in a television.

Figure 2:
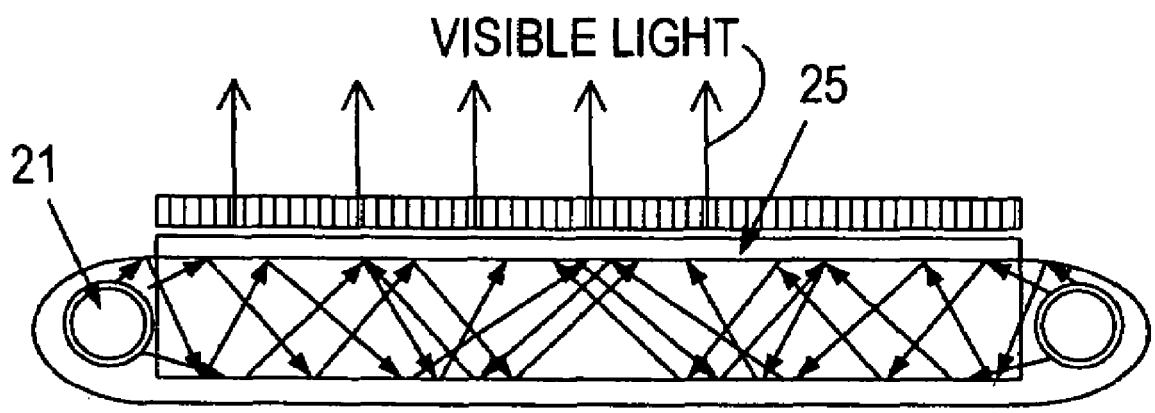
FIG. 2 is a cross-sectional view through a backlight arrangement with external electrodes.

As shown in the embodiment of FIG. 2, the illuminating tubes 21 can also be mounted outside the display. Then the light is uniformly scattered uniformly over the display by means of a conveying plate 25 serving as a light guide, a so-called LGP (light guide plate). In both cases the illuminating tube can have external or internal electrodes.

Figure 3:
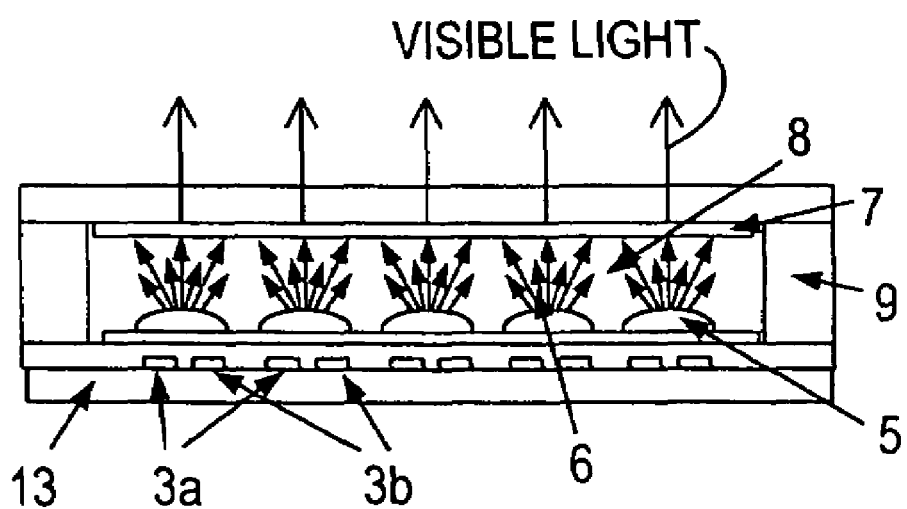
FIG. 3 is a display arrangement with laterally mounted fluorescent lights.

Furthermore it is also possible to use it for this sort of backlight arrangement in which the light-producing unit is arranged in a structured plate 13, as shown in FIG. 3. The structuring is such that channels with a predetermined depth and a predetermined width ($d_{channel}$ or $w_{channel}$) are produced by means of parallel elevated portions, the so-called barriers 8, in which the discharge light sources 5 are located. The channels together with the plate provided with a phosphor layer 7 form the radiating chamber 6. The plates themselves are sealed laterally 9 and provided with electrodes through through-going guides. One embodiment is a so-called CCFL system (cold cathode fluorescent lamp). However an outside contact, i.e. ignition of the plasma by an outer electric field, is possible (EEFL external electrode fluorescent lamp). The field is provided by outer electrodes 3a, 3b. This arrangement forms a large flat backlight and is also called a flat backlight. The application of the glass according to the invention concerns the structured plate of the flat backlight and/or the cover plate. Both together form the radiating chamber.

To make this sort of structured plate a blank, which is obtained by rolling, is pressed by means of a conventional structuring unit, for example a suitable structuring roll. Moreover the glass is heated to a temperature, at which it has a viscosity that is suitable for that purpose, which is a temperature between the processing temperature and the softening temperature. The structured plate has structures with depths and widths in the dimensions of several centimeters (e.g. 0.1, usually 0.3 mm) to a few millimeters (e.g. 1 to 8 mm). This sort of structuring can also occur by other manufacturing methods, such as embossing or stamping, carving or engraving, milling, chemical etching or laser ablation. The desired structure can also be obtained directly from the melt by certain hot molding processes.

It has been shown that the glass according to the invention is especially good for making lamp glass, especially for EEFL fluorescent lamps (external electrode fluorescent lamps), which are preferred for imaging screens, display applications, such as LCDs or TFT units, and in scanners, advertising signs, medical instruments and apparatus for aircraft and spacecraft, as well as navigation devices and mobile telephones and personal digital assistances (PDA).

The glass discharge tubes made with the glass according to the invention that are used for fluorescent lights preferably contain Ar, Ne and preferably Xe and Hg if necessary. Fluorescent lamps containing Xe as a filling gas, which are preferably free of Hg, are especially preferred.

The glasses obtained and used according to the invention preferably have a comparatively low dielectric constant (dielectric constant DZ). The dielectric loss factor tan δ [$10^{-4}$] amounts preferably to at least 5, especially at least 10, but values of at least 20 and/or at least 40 are most preferred. Appropriate upper limits for tan δ usually amount to 200 and/or 180, but values of 150 and especially 130 are particularly preferred.

The following examples illustrate the above-described invention in more detail, but the details in these examples should not be considered as limiting the claims appended hereinbelow.

EXAMPLES

Exemplary glasses of the invention and comparative glasses of the prior art set forth in the following Tables Ia and Ib were melted and refined under oxidizing conditions, as described above with $As_2O_3$. The UV absorption, visible transmission and other properties of the glass were measured and are tabulated in Tables IIa and IIb. In these tables the examples of the invention are numbered with integers and the comparative glasses of the prior art are numbered with primed numbers, e.g. 6'. The compositions are in % by weight on an oxide basis.

The measurements of the transmission occurred with glasses, which were very rapidly cooled, i.e. without fine annealing. The UV cutoff can be further shifted into the visible range by fine annealing, or subsequent short time temperature fine annealing and/or subsequent short-time temperature treatment.

TABLE IIa

PROPERTIES OF GLASS COMPOSITIONS ACCORDING TO THE INVENTION AND THE COMPARATIVE COMPOSITIONS

|  | 1 | 2 | 3 | 4 | 5 | 6' | 7' | 8' |
|---|---|---|---|---|---|---|---|---|
| α (alpha) × [$10^4$]/K | 9.10 | | | | | | | |
| Tg, °C. | 525.0 | | | | | | | |
| $T_4$, °C. | | | | | | | | |
| T < 0.1% D = 0.2 mm, Sample uncooled at | 264 nm | 297 nm | 318 nm | 313 nm | 260 nm | 317 nm | 318 nm | 298 nm |
| T at 700 nm (d = 0.2 mm), % | 91.30 | 91.10 | 90.90 | 90.90 | 88.20 | 81.40 | 80.90 | 81.20 |

The glasses 6', 7' and 8' are comparative examples (refined with chloride). The transmission at 700 nm (d=0.2 mm) is clearly well under 90%.

TABLE Ib

GLASS COMPOSITIONS OF THE INVENTION AND COMPARATIVE COMPOSITIONS

|  | Actual ingredient added, if different | 9 | 10 | 11 | 12' | 13' |
|---|---|---|---|---|---|---|
| $SiO_2$ | | 69.90 | 67.70 | 65.70 | 65.70 | 67.70 |
| $B_2O_3$ | | | | | | |
| $Al_2O_3$ | | | | | | |
| $Li_2O$ | | | | | | |
| $Na_2O$ | $Na_2CO_3$ | 8.00 | 4.00 | 4.00 | 2.80 | 4.00 |
| $Na_2O$ | $NaNO_3$ | | 4.00 | 4.00 | 4.00 | 4.00 |
| $Na_2O$ | NaCl | | | | | |

TABLE Ia

GLASS COMPOSITIONS OF THE INVENTION AND COMPARATIVE COMPOSITIONS

|  | Actual ingredient added to batch, if different | 1 | 2 | 3 | 4 | 5 | 6' Comp. | 7' Comp. | 8' Comp. |
|---|---|---|---|---|---|---|---|---|---|
| $SiO_2$ | | 68.55 | 66.50 | 66.60 | 65.00 | 67.90 | 65.10 | 64.70 | 66.50 |
| $B_2O_3$ | | 1.00 | 0.90 | | 1.00 | 1.00 | 1.00 | 1.00 | 0.90 |
| $Al_2O_3$ | | 4.00 | 3.88 | 0.35 | 4.00 | 4.00 | 4.00 | 4.00 | 3.88 |
| $Li_2O$ | | | | | | | | | |
| $Na_2O$ | $Na_2CO_3$ | 12.60 | 10.90 | 14.20 | 8.60 | 12.80 | 7.80 | 12.00 | 12.40 |
| $Na_2O$ | $NaNO_3$ | | 2.00 | | 4.00 | | 4.00 | | |
| $Na_2O$ | NaCl | | | | | | 0.80 | 0.80 | 0.80 |
| $K_2O$ | | 3.20 | 3.10 | 0.05 | 3.20 | 3.20 | 3.20 | 3.30 | 3.10 |
| MgO | | 2.60 | 2.50 | 4.20 | 2.60 | 2.60 | 2.60 | 2.60 | 2.50 |
| CaO | | 5.00 | 5.10 | 9.90 | 5.00 | 5.00 | 5.00 | 5.00 | 5.10 |
| SrO | | | | | | | | | |
| BaO | | 2.00 | 2.00 | | 2.00 | 2.00 | 2.00 | 2.00 | 2.00 |
| $As_2O_3$ | | 0.05 | 0.10 | 0.10 | 0.10 | | | 0.10 | 0.10 |
| $Sb_2O_3$ | | | | | | 0.50 | | | |
| $MnO_2$ | | | | | | | | | |
| $Fe_2O_3$ | | | 0.20 | 0.10 | | 0.20 | | | 0.20 |
| $TiO_2$ | | 1.00 | 3.00 | 4.50 | 4.50 | 0.80 | 4.50 | 4.50 | 3.00 |
| $CeO_2$ | | | | | | | | | |
| $F^-$ | | 0.20 | | | | | | 0.20 | |
| $Cl^-$ | | | | | | | | | |
| Sum | | 100.00 | 100.00 | 100.00 | 100.00 | 100.00 | 100.00 | 100.00 | 100.00 |

TABLE Ib-continued

GLASS COMPOSITIONS OF THE INVENTION
AND COMPARATIVE COMPOSITIONS

| Actual ingredient added, if different | 9 | 10 | 11 | 12' | 13' |
|---|---|---|---|---|---|
| $K_2O$ | 8.40 | 8.40 | 8.40 | 8.40 | 8.40 |
| MgO | | | | | |
| CaO | 7.00 | 7.00 | 7.00 | 7.00 | 7.00 |
| SrO | | | | | |
| BaO | 2.10 | 2.10 | 2.10 | 2.10 | 2.10 |
| ZnO | 4.30 | 4.30 | 4.30 | 4.30 | 4.30 |
| PbO | | | | | |
| $TiO_2$ | 0.30 | 2.50 | 4.50 | 4.50 | 4.50 |
| $ZrO_2$ | | | | | |
| $CeO_2$ | | | | | |
| $P_2O_5$ | | | | | |
| $F^-$ | | | | | |
| $Cl^-$ | | | | | |
| $As_2O_3$ | | 0.10 | 0.10 | | |
| $Sb_2O_3$ | | | | | 0.10 |
| $Fe_2O_3$ | | [0.01] | [0.01] | [0.01] | [0.01] |
| Sum | 100.00 | 100.00 | 100.00 | 100.00 | 100.00 |

TABLE IIb

PROPERTIES OF GLASS COMPOSITIONS ACCORDING
TO THE INVENTION AND THE COMPARATIVE
COMPOSITIONS

| | 9 | 10 | 11 | 12' | 13' |
|---|---|---|---|---|---|
| $\alpha$ (alpha) × $[10^4]$/K | 9.40 | | | | |
| Tg, °C. | 530.0 | | | | |
| $T_4$, °C. | 1030.0 | | | | |
| T < 0.1% D = 0.2 mm, Sample uncooled | 257 nm | 298 nm | 318 nm | 314 nm | 315 nm |
| at T at 700 nm (d = 0.2 mm), % | 90.90 | 91.00 | 90.70 | 81.10 | 87.00 |

The glasses 12' and 13' are comparative glass examples. Glass 12' contains no refining agent, neither $As_2O_3$ nor $Sb_2O_3$. The transmission at 700 nm (d=0.2 mm) amounts to well under 90% for example 12'. Glass 13' was refined with $Sb_2O_3$ as refining agent. The transmission at 700 nm for glass 13' is greater than that for glass 12', but always still clearly less than the exemplary glasses of the invention, which were refined using $As_2O_3$.

The disclosure in German Patent Application DE 10 2004 033 653.9 of Jul. 12, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in glass for an EEFL fluorescent lamp, process for making the glass and devices including articles, especially fluorescent lights, made with the glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A process for making a UV-absorbing glass, especially for a fluorescent lamp, said process comprising preparing a glass melt, said glass melt having a composition, in % by weight on an oxide basis of:

| | |
|---|---|
| $SiO_2$ | 60-85 |
| $B_2O_3$ | 0-2 |
| $Al_2O_3$ | 0-10 |
| $Li_2O$ | 0-10 |
| $Na_2O$ | 0-20 |
| $K_2O$ | 0-20 |
| MgO | 0-8 |
| CaO | 0-20 |
| SrO | 0-5 |
| BaO | 0-5 |
| ZnO | 0-8 |
| $ZrO_2$ | 0-5 |
| $TiO_2$ | 0-10 |
| $Fe_2O_3$ | 0-5 |
| $CeO_2$ | 0-5 |
| $MnO_2$ | 0-5 |
| $Nd_2O_3$ | 0-1.0 |
| $WO_3$ | 0-2 |
| $Bi_2O_3$ | 0-5 |
| PbO | 0-5 |
| $MoO_3$ | 0-5 |
| $As_2O_3$ | 0-1 |
| $Sb_2O_3$ | 0-1 |
| $SO_4^{2-}$ | 0-2 |
| $Cl^-$ | 0-2 |
| $F^-$ | 0-2; | wherein a sum total amount of $Li_2O+Na_2O+K_2O$ is 5 to 25% by weight; a sum total amount of $MgO+CaO+SrO+BaO$ is 3 to 20% by weight; a sum total amount of $Fe_2O_3+CeO_2+TiO_2+PbO+As_2O_3+Sb_2O_3$ is at least 0.1 to 10% by weight; and a sum total amount of $PdO+PtO_3+PtO_2+PtO+RhO_2+Rh_2O_3+IrO_2+Ir_2O_3$ is from 0.00001-0.1% by weight.

2. The process as defined in claim 1, wherein said glass melt contains from 0.1-10% by weight of $TiO_2$; from 0.005-0.5% by weight of $Fe_2O_3$ and/or from 0-0.5% by weight of $CeO_2$.

3. The process as defined in claim 2, wherein said glass melt contains less than 300 ppm of $CeO_2$.

4. The process as defined in claim 1, further comprising refining and/or melting a glass batch from which said glass melt is formed under oxidizing conditions.

5. The process as defined in claim 4, further comprising addition of alkali nitrates and/or alkaline earth nitrates to the glass batch during the refining and/or melting.

6. A UV-absorbing glass made by a process comprising preparing a glass melt, said glass melt having a composition, in % by weight on an oxide basis of:

| | |
|---|---|
| $SiO_2$ | 60-85 |
| $B_2O_3$ | 0-2 |
| $Al_2O_3$ | 0-10 |
| $Li_2O$ | 0-10 |
| $Na_2O$ | 0-20 |
| $K_2O$ | 0-20 |
| MgO | 0-8 |

-continued

| | |
|---|---|
| CaO | 0-20 |
| SrO | 0-5 |
| BaO | 0-5 |
| ZnO | 0-8 |
| ZrO$_2$ | 0-5 |
| TiO$_2$ | 0-10 |
| Fe$_2$O$_3$ | 0-5 |
| CeO$_2$ | 0-5 |
| MnO$_2$ | 0-5 |
| Nd$_2$O$_3$ | 0-1.0 |
| WO$_3$ | 0-2 |
| Bi$_2$O$_3$ | 0-5 |
| PbO | 0-5 |
| MoO$_3$ | 0-5 |
| As$_2$O$_3$ | 0-1 |
| Sb$_2$O$_3$ | 0-1 |
| SO$_4^{2-}$ | 0-2 |
| Cl$^-$ | 0-2 |
| F$^-$ | 0-2; | wherein a sum total amount of Li$_2$O+Na$_2$O+K$_2$O is 5 to 25% by weight; a sum total amount of MgO+CaO+SrO+BaO is 3 to 20% by weight; a sum total amount of Fe$_2$O$_3$+CeO$_2$+TiO$_2$+PbO+As$_2$O$_3$+Sb$_2$O$_3$ is at least 0.1 to 10% by weight; and a sum total amount of PdO+PtO$_3$+PtO$_2$+PtO+RhO$_2$+Rh$_2$O$_3$+IrO$_2$+Ir$_2$O$_3$ is from 0.00001-0.1% by weight.

7. The glass as defined in claim 6, wherein said glass melt contains from 0.1-10% by weight of TiO$_2$; from 0.005-0.5% by weight of Fe$_2$O$_3$ and/or from 0-0.5% by weight of CeO$_2$.

8. The glass as defined in claim 7, wherein said glass melt contains less than 300 ppm of CeO$_2$.

9. The glass as defined in claim 6, wherein said process includes refining and/or melting a glass batch from which said glass melt is formed under oxidizing conditions.

10. The glass as defined in claim 9, wherein said process includes addition of alkali nitrates and/or alkaline earth nitrates to the glass batch during the refining and/or melting.

11. The glass as defined in claim 6, having a dielectric loss factor (tan δ) of 5 to 200×10$^{-4}$.

12. The glass as defined in claim 6, having a transmission of less than or equal to 0.1% at 260 nm for a sample thickness of 0.2 mm.

13. The glass as defined in claim 6, having a transmission of less than or equal to 0.1% at 313 nm for a sample thickness of 0.2 mm.

14. A display device made with the UV-absorbing glass as defined in claim 6, wherein said display device is an LCD display, a computer monitor, a telephone display or a TFT display.

15. A gas discharge lamp made with a UV-absorbing glass, wherein said UV-absorbing glass is made by a process, said process comprising preparing a glass melt, said glass melt having a composition, in % by weight on an oxide basis of:

| | |
|---|---|
| SiO$_2$ | 60-85 |
| B$_2$O$_3$ | 0-2 |
| Al$_2$O$_3$ | 0-10 |
| Li$_2$O | 0-10 |
| Na$_2$O | 0-20 |
| K$_2$O | 0-20 |
| MgO | 0-8 |
| CaO | 0-20 |
| SrO | 0-5 |
| BaO | 0-5 |
| ZnO | 0-8 |
| ZrO$_2$ | 0-5 |
| TiO$_2$ | 0-10 |
| Fe$_2$O$_3$ | 0-5 |
| CeO$_2$ | 0-5 |
| MnO$_2$ | 0-5 |
| Nd$_2$O$_3$ | 0-1.0 |
| WO$_3$ | 0-2 |
| Bi$_2$O$_3$ | 0-5 |
| PbO | 0-5 |
| MoO$_3$ | 0-5 |
| As$_2$O$_3$ | 0-1 |
| Sb$_2$O$_3$ | 0-1 |
| SO$_4^{2-}$ | 0-2 |
| Cl$^-$ | 0-2 |
| F$^-$ | 0-2; | wherein a sum total amount of Li$_2$O+Na$_2$O+K$_2$O is 5 to 25% by weight; a sum total amount of MgO+CaO+SrO+BaO is 3 to 20% by weight; a sum total amount of Fe$_2$O$_3$+CeO$_2$+TiO$_2$+PbO+As$_2$O$_3$+Sb$_2$O$_3$ is at least 0.1 to 10% by weight; and a sum total amount of PdO+PtO$_3$+PtO$_2$+PtO+RhO$_2$+Rh$_2$O$_3$+IrO$_2$+Ir$_2$O$_3$ is from 0.00001-0.1% by weight.

16. The gas discharge lamp as defined in claim 15, consisting of a fluorescent lamp.

17. The gas discharge lamp as defined in claim 16, wherein the fluorescent lamp is an EEFL fluorescent lamp or is miniaturized.

18. The gas discharge lamp as defined in claim 15, wherein said UV-absorbing glass has a dielectric loss factor (tan δ) of 5 to 200×10$^{-4}$.

19. The gas discharge lamp as defined in claim 15, wherein said process includes refining and/or melting a glass batch from which said glass melt is formed under oxidizing conditions.

20. The gas discharge lamp as defined in claim 19, wherein said process includes addition of alkali nitrates and/or alkaline earth nitrates to the glass batch during the refining and/or melting.

21. The gas discharge lamp as defined in claim 15, wherein said glass melt contains from 0.1-10% by weight of TiO$_2$; from 0.005-0.5% by weight of Fe$_2$O$_3$ and/or from 0-0.5% by weight of CeO$_2$.

* * * * *